(12) United States Patent
Nasianceno

(10) Patent No.: US 11,008,130 B1
(45) Date of Patent: May 18, 2021

(54) MULTI-LAYER RECYCLABLE CUP

(71) Applicant: Rosalio Nasianceno, Pontiac, MI (US)

(72) Inventor: Rosalio Nasianceno, Pontiac, MI (US)

(*) Notice: Subject to any disclaimer, the term of this patent is extended or adjusted under 35 U.S.C. 154(b) by 0 days.

(21) Appl. No.: 16/595,650

(22) Filed: Oct. 8, 2019

(51) Int. Cl.
| | |
|---|---|
| *B65D 3/06* | (2006.01) |
| *B65D 81/38* | (2006.01) |
| *B65D 65/46* | (2006.01) |
| *B65D 65/40* | (2006.01) |
| *B32B 15/12* | (2006.01) |
| *B32B 15/20* | (2006.01) |
| *B32B 1/02* | (2006.01) |

(52) U.S. Cl.
CPC ............... *B65D 3/06* (2013.01); *B32B 1/02* (2013.01); *B32B 15/12* (2013.01); *B32B 15/20* (2013.01); *B65D 65/40* (2013.01); *B65D 65/466* (2013.01); *B65D 81/3874* (2013.01); *B32B 2255/12* (2013.01); *B32B 2255/24* (2013.01); *B32B 2307/304* (2013.01); *B32B 2307/7265* (2013.01); *B32B 2439/02* (2013.01); *B32B 2439/70* (2013.01)

(58) Field of Classification Search
CPC ........ B65D 3/06; B65D 65/40; B65D 65/466; B65D 81/3874; B65D 2565/385; B65D 1/265; B32B 1/02; B32B 15/12; B32B 27/04; C08L 2660/02; C04B 41/61; C04B 16/02; Y02W 90/10
USPC ............ 229/403, 4.5, 400, 5.82; 220/592.17, 220/739, 62.12; 206/524.3; 493/907, 493/296
See application file for complete search history.

(56) References Cited

U.S. PATENT DOCUMENTS

| | | | |
|---|---|---|---|
| 3,406,891 A | 10/1968 | Norbert | |
| 4,435,344 A | 3/1984 | Iioka | |
| 5,205,473 A * | 4/1993 | Coffin, Sr. | B65D 3/22 206/813 |
| 5,385,764 A * | 1/1995 | Andersen | B01F 3/1214 428/34.4 |
| 5,514,430 A * | 5/1996 | Andersen | B01F 3/1214 428/34.4 |
| 5,580,409 A * | 12/1996 | Andersen | B01F 3/1214 156/210 |
| 5,665,439 A * | 9/1997 | Andersen | B32B 5/02 428/34.5 |
| 5,720,913 A * | 2/1998 | Andersen | B01F 3/1214 264/108 |
| 5,769,311 A * | 6/1998 | Morita | B31F 1/0051 220/592.17 |
| 5,964,400 A | 10/1999 | Varano | |
| 6,250,545 B1 * | 6/2001 | Mazzarolo | B65D 81/3876 220/592.17 |
| 8,448,810 B2 | 5/2013 | Kelly | |
| 8,701,914 B1 | 4/2014 | Buck | |

(Continued)

FOREIGN PATENT DOCUMENTS

WO      9707030      2/1997

*Primary Examiner* — Christopher R Demeree

(57) ABSTRACT

The multi-layer recyclable cup is a container. The multi-layer recyclable cup is configured for use in storing a hot liquid. The hot liquid is adapted for consumption by a person. The multi-layer recyclable cup is an insulating structure that inhibits the hot liquid from decreasing in temperature while stored in the multi-layer recyclable cup. The multi-layer recyclable cup comprises a cup. The cup is formed from a composite material. The composite material is a fully recyclable structure.

14 Claims, 3 Drawing Sheets

(56) References Cited

U.S. PATENT DOCUMENTS

D744,279 S 12/2015 Arciero
9,440,410 B2 9/2016 Marshall

\* cited by examiner

MULTI-LAYER RECYCLABLE CUP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and storage including containers, more specifically, a semi-rigid container having curved peripheral walls made by bending paper. (B65D3/22)

SUMMARY OF INVENTION

The multi-layer recyclable cup is a container. The multi-layer recyclable cup is configured for use in storing a hot liquid. The hot liquid is adapted for consumption by a person. The multi-layer recyclable cup is an insulating structure that inhibits the hot liquid from decreasing in temperature while stored in the multi-layer recyclable cup. The multi-layer recyclable cup comprises a cup. The cup is formed from a composite material. The composite material is a fully recyclable structure.

These together with additional objects, features and advantages of the multi-layer recyclable cup will be readily apparent to those of ordinary skill in the art upon reading the following detailed description of the presently preferred, but nonetheless illustrative, embodiments when taken in conjunction with the accompanying drawings.

In this respect, before explaining the current embodiments of the multi-layer recyclable cup in detail, it is to be understood that the multi-layer recyclable cup is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the multi-layer recyclable cup.

It is therefore important that the claims be regarded as including such equivalent construction insofar as they do not depart from the spirit and scope of the multi-layer recyclable cup. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
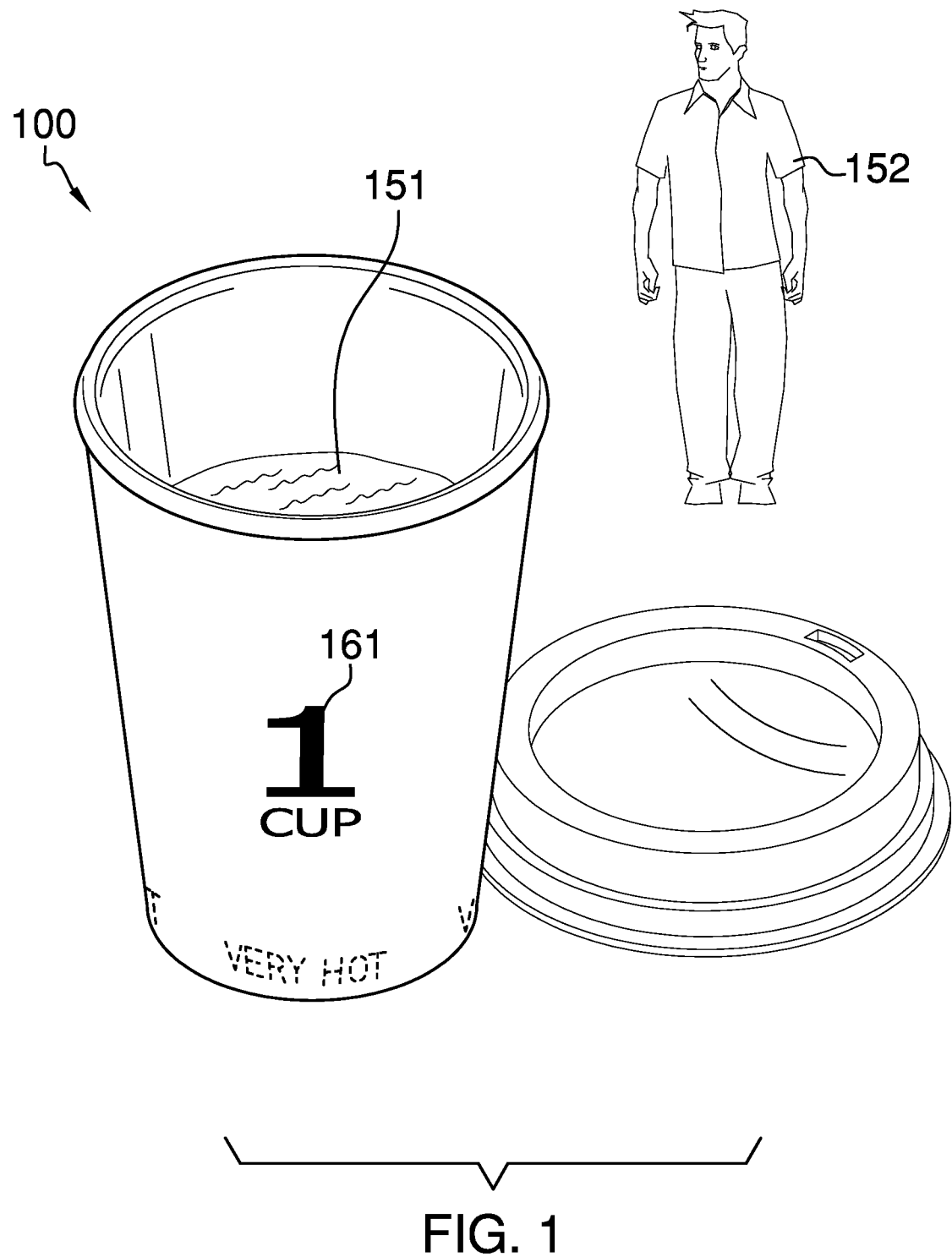
FIG. 1 is a perspective view of an embodiment of the disclosure.
Figure 2:
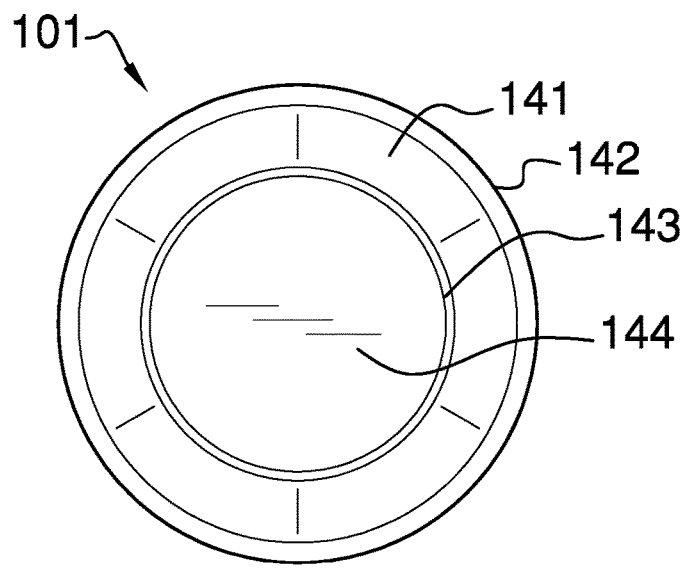
FIG. 2 is a bottom view of an embodiment of the disclosure.
Figure 3:
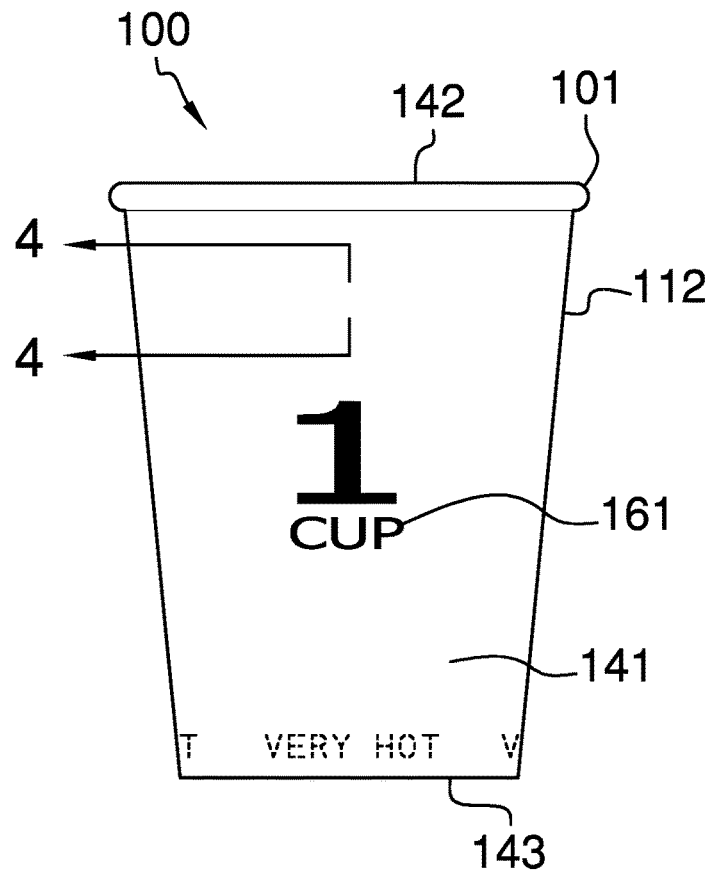
FIG. 3 is a side view of an embodiment of the disclosure.
Figure 4:
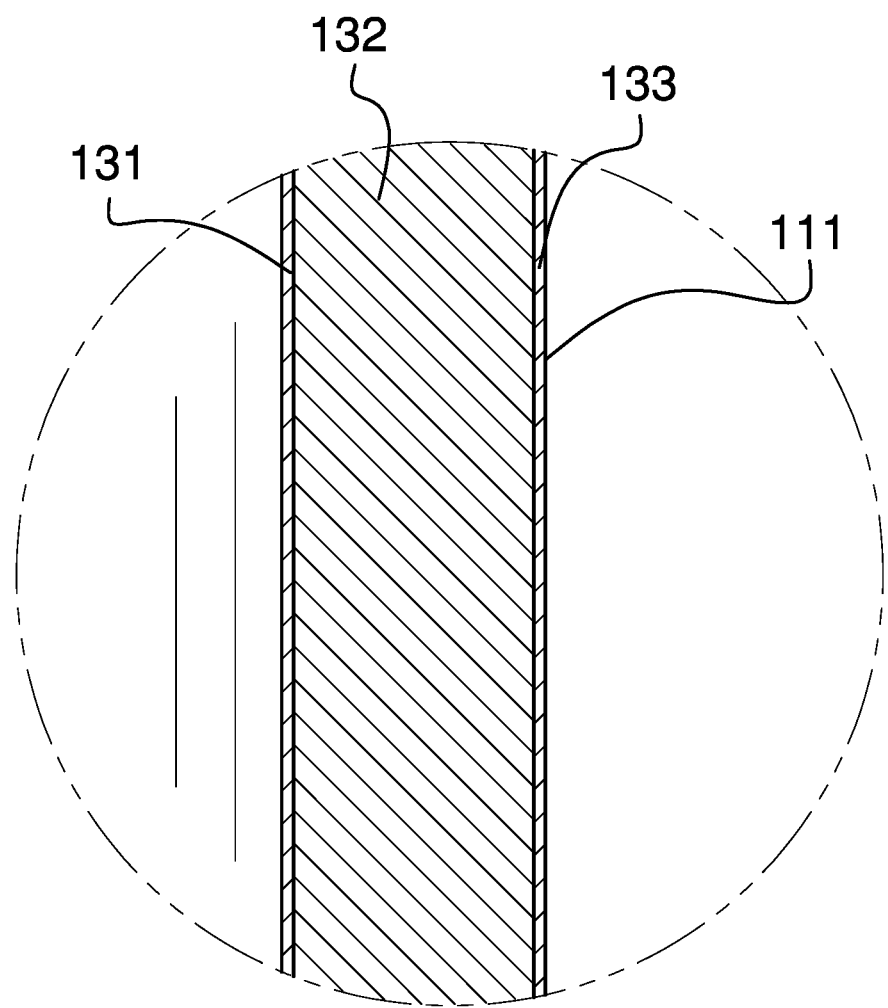
FIG. 4 is a cross-sectional view of an embodiment of the disclosure across 4-4 as shown in FIG. 3.

Detailed reference will now be made to one or more potential embodiments of the disclosure, which are illustrated in FIGS. 1 through 4.

The multi-layer recyclable cup 100 (hereinafter invention) is a container. The invention 100 is configured for use in storing a hot liquid 151. The hot liquid 151 is adapted for consumption by a person 152. The invention 100 is an insulating structure that inhibits the hot liquid 151 from decreasing in temperature while stored in the invention 100. The invention 100 comprises a cup 101. The cup 101 is formed from a composite material 111. The composite material 111 is a fully recyclable structure.

The cup 101 is a handheld container. The cup 101 is configured for use by a person 152. The cup 101 contains the hot liquid 151 that is consumed by the person 152. The cup 101 is a recyclable structure. By recyclable is meant that the invention 100 is suitable for processing through a recycling facility after disposal by the person 152. The cup 101 is an insulating structure that inhibits the hot liquid 151 from cooling while in the cup 101.

The cup 101 is formed from a composite material 111. The composite material 111 is a sheeting material. The composite material 111 forms the physical structure of the cup 101. The composite material 111 is formed entirely from recyclable materials. The cup 101 is formed by folding a number of pieces of the composite material 111 into the cup 101 shape. The number of pieces of composite material 111 used to fold the composite material 111 into the cup 101 shape is selected from the group consisting of one piece and two pieces. Methods to fold one piece of sheeting into a cup 101 are well-known and documented in the mechanical arts. Methods to fold two pieces of sheeting into a cup 101 are well-known and documented in the mechanical arts. The composite material 111 comprises an aluminum layer 131, a cardboard layer 132, and a beeswax layer 133.

The aluminum layer 131 is a sheeting material formed from aluminum foil. The aluminum layer 131 forms an exterior surface of the composite material 111. The aluminum layer 131 forms the interior surface of the cup 101. The composite material 111 is cut, manipulated, and folded such that the aluminum layer 131 forms the interior surface of the truncated pyramidal shape 112 of the cup 101. The aluminum layer 131 attaches as a layer to the cardboard layer 132. Methods to attach an aluminum layer 131 to a cardboard layer 132 to form a composite material 111 are well-known and documented in the material science arts.

The cardboard layer 132 is a sheeting material formed from a cardboard. The cardboard layer 132 is a semi-rigid structure. The cardboard layer 132 is enclosed by the aluminum layer 131 and the beeswax layer 133. The aluminum layer 131 forms a fluid impermeable barrier that prevents the hot liquid 151 from saturating the cardboard layer 132.

The beeswax layer 133 forms an exterior surface of the composite material 111. The beeswax layer 133 forms an exterior surface of the cup 101. The beeswax layer 133 forms a fluid impermeable barrier that prevents any hot liquid 151 absorbed by the cardboard layer 132 from escaping the cardboard layer 132 to reach the hot liquid 151. The beeswax layer 133 is a coating. The beeswax layer 133 is formed from a readily and commercially available beeswax. The beeswax layer 133 coats the surface of the cardboard layer 132 that is distal from the aluminum layer 131. The organic and non-polar chemistry of the beeswax layer 133 forms a hydrophobic structure that contains any hot liquid 151 absorbed by the cardboard layer 132 within the exterior structure formed by the composite material 111 of the cup 101. Methods to apply a beeswax layer 133 coating to a sheeting are well-known and documented in the material science arts.

It shall be noted that the beeswax layer 132 may be replaced with a second aluminum layer 132. This change would enable the product to be more durable, and reusable. The second aluminum layer 132 is identical to the aluminum layer 131 described elsewhere in this disclosure. For purposes of the patent application, the terms second aluminum layer 132 and the beeswax layer 132 are interchangeable.

The cup 101 has the form factor of a truncated pyramidal shape 112. The truncated pyramidal shape 112 is a hollow structure used to contain the hot liquid 151. The truncated pyramidal shape 112 comprises a lateral face 141, an open base 142, and a truncated apex 143.

The lateral face 141 refers to the lateral face 141 of the truncated pyramidal shape 112 of the cup 101. The lateral face 141 forms the vertical containment of the containment structure formed by the truncated pyramidal shape 112 of the cup 101. The lateral face 141 is a solid structure formed from the composite material 111.

The open base 142 is the base of the truncated pyramidal shape 112 of the cup 101. The open base 142 is an open structure through which the hot liquid 151 is introduced into and removed from the containment structure formed by the truncated pyramidal shape 112 of the cup 101. The open base 142 forms the superior surface of the truncated pyramidal shape 112 of the cup 101.

The truncated apex 143 is the surface of the truncated pyramidal shape 112 of the cup 101 that was truncated by the truncating plane. The truncated apex 143 is enclosed by the enclosing surface 144 such that the truncated pyramidal shape 112 of the cup 101 functionally creates a structure modeled after a capped tube. The truncated apex 143 is geometrically similar to the shape formed by the open base 142. The truncated apex 143 forms the inferior surface of the truncated pyramidal shape 112 of the cup 101.

The truncated apex 143 further comprises an enclosing surface 144. The enclosing surface 144 is a solid structure formed from the composite material 111. The enclosing surface 144 forms a barrier structure in the truncated apex 143 such that the hot liquid 151 remains contained in the hollow interior of the truncated pyramidal shape 112 of the cup 101 when the invention 100 is used normally.

The following definitions were used in this disclosure:

Aluminum: As used in this disclosure, aluminum is a metal. Aluminum (CAS 7429-90-5) is element 13 in the periodic table and has a designated abbreviation of Al.

Apex: As used in this disclosure, an apex is a vertex that forms an extreme or solitary point of an object.

Base: As used in this disclosure, a base is the surface of a pyramid that is distal from: a) the apex of a pyramid; or, b) the truncated surface of a truncated pyramid.

Capped Tube: As used in this disclosure, a capped tube is a hollow tube with one closed end and one open end.

Cardboard: As used in this disclosure, cardboard is a structural sheeting made from a fibrous material similar to that used in the manufacture of paper. Cardboard is an inexpensive material commonly used to make containers.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Coating: As used in this disclosure, a coating refers to a substance applied to the exterior surface of an object such that the coating forms a new exterior surface of the object. A coating is commonly said to be formed as a layer. Paint is an example of a common coating material.

Composite Material: As used in this disclosure, a composite material is a multilayer structure made of two or more joined layers of sheeting materials and coatings.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Corrugated: As used in this disclosure, the term corrugated describes a structure formed with a series of parallel and alternating ridges and grooves Cup: As used in this disclosure, a cup is a container that is intended to contain a fluid. The cup has a shape that roughly corresponds to a capped tube. Glass, mug, stein, and tumbler are synonyms for a cup.

Exterior: As used in this disclosure, the exterior is used as a relational term that implies that an object is not contained within the boundary of a structure or a space.

Fluid: As used in this disclosure, a fluid refers to a state of matter wherein the matter is capable of flow and takes the shape of a container it is placed within. The term fluid commonly refers to a liquid or a gas.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Image: As used in this disclosure, an image is an optical representation or reproduction of an indicia or of the appearance of something or someone.

Indicia: As used in this disclosure, the term indicia refers to a set of markings that identify a sentiment. See sentiment.

Inferior: As used in this disclosure, the term inferior refers to an edge or surface of an object that would commonly be referred to as the bottom of the object.

Insulating Material: As used in this disclosure, an insulating material is a material that inhibits, and ideally prevents, the transfer of heat through the insulating material. Insulating materials may also be used to inhibit or prevent the transfer of sound or the conduction of electricity through the insulating material. Methods to form insulating materials include, but are not limited to: 1) the use of materials with low thermal conductivity; and, 2) the use of a structural design that places a vacuum within the insulating material within the anticipated transfer path of the heat, sound, or electric current flow.

Insulating Structure: As used in this disclosure, an insulating structure is a structure that inhibits, and ideally prevents, the transfer of heat through the insulating structure. Insulating structures may also be used to inhibit or prevent the transfer of sound through the insulating structure. Methods to form insulating structures include, but are not limited to: 1) the use of materials with low thermal conductivity; and, 2) the use of a structural design that places a vacuum within the insulating structure within the anticipated transfer path of the heat or sound.

Interior: As used in this disclosure, the interior is used as a relational term that implies that an object is contained within the boundary of a structure or a space.

Liquid: As used in this disclosure, a liquid refers to a state (phase) of matter that is fluid and that maintains, for a given pressure, a fixed volume that is independent of the volume of the container.

N-gon: As used in this disclosure, an N-gon is a regular polygon with N sides wherein N is a positive integer number greater than 2.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Organic: As used in this disclosure, organic refers to a carbon-based chemical structure. A limited number of carbon-based salts are traditionally considered inorganic chemical structures and are excluded from the study of organic chemistry.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pyramid: As used in this disclosure, a pyramid is a three-dimensional shape that comprises a base formed in the shape of an N-gon (wherein N is an integer) with N triangular faces that rise from the base to converge at a point above the base. If the point where the N faces meet is positioned such that a line drawn from the point where the N faces meet to the center of the N-gon base is perpendicular to the N-gon base, the pyramid is referred to as a right pyramid. Pyramids can be further formed with circular or elliptical bases which are commonly referred to as cone or an elliptical pyramid respectively. A pyramid is defined with a base, an apex, and a lateral face. The base is the N-gon shaped base described above. The apex is the convergence point described above. The lateral face is formed from the N triangular faces described above.

Salt: As used in this disclosure, a salt means an ionic compound that further comprises at least one atom of a metallic element or compound and one atom of a non-metallic element or compound. When dissolved in water, the ionic compound releases the metallic element and the non-metallic element into the water as ions. In this disclosure, a metallic element is assumed to include the alkali metals and the alkali earth metals. Alternatively, and equivalently, a metallic element may be assumed to be any element on the periodic table that is to the left of the metalloids.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Sentiment: As used in this disclosure, a sentiment refers to a symbolic meaning or message that is communicated through the use of an image, potentially including a text-based image. See image and optical character recognition Sheeting: As used in this disclosure, a sheeting is a material, such as a paper, textile, a plastic, or a metal foil, in the form of a thin flexible layer or layers.

Superior: As used in this disclosure, the term superior refers to an edge or surface of an object that would commonly be referred to as the top of the object.

Temperature: As used in this disclosure, temperature refers to a relative measure of the kinetic and vibrational energy contained in the atoms and molecules of a first object (or system) relative to the kinetic and vibrational energy contained in the atoms and molecules of a second object (or system). When two objects (or systems) are in thermal equilibrium, the temperature of the two objects (or systems) is the same.

Truncated: As used in this disclosure, a geometric object is truncated when an apex, vertex, or end is cut off by a line or plane.

Truncated Pyramid: As used in this disclosure, a truncated pyramid is a frustum that remains when the apex of a pyramid is truncated by a plane that is parallel to the base of the pyramid.

Tube: As used in this disclosure, a tube is a hollow prism-shaped device formed with two open ends. The tube is used for transporting liquids and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

Wax: As used in this disclosure, a wax can be any of numerous substances of plant, animal, or synthetic origin composed principally of nonpolar organic compounds of high molecular weight including, but not limited to, mixtures of saturated or unsaturated hydrocarbons, and lipids including esters of long-chain alcohols or fatty acids. Waxes are solid at room temperature and insoluble in water. For the purpose of this disclosure, a wax is considered to be a lipid.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A semi-rigid container comprising:
   a cup;
   wherein the semi-rigid container is configured for use in storing a hot liquid;
   wherein the hot liquid is adapted for consumption by a person;
   wherein the cup is a handheld container;
   wherein the cup is configured for use by a person;
   wherein the cup contains the hot liquid;
   wherein the cup is a recyclable structure;
   wherein the cup is an insulating structure;
   wherein the cup is formed from a composite material;
   wherein the composite material comprises an aluminum layer, a cardboard layer, and a beeswax layer;
   wherein the aluminum layer attaches to the cardboard layer;
   wherein the beeswax layer attaches to the cardboard layer;
   wherein the cup has the form factor of a truncated pyramidal shape;
   wherein the truncated pyramidal shape is a hollow structure;
   wherein the composite material is cut to form the surface of the truncated pyramidal shape of the cup;
   wherein the composite material is folded such that the aluminum layer forms the interior surface of the truncated pyramidal shape of the cup;
   wherein the composite material forms the physical structure of the cup;
   wherein the composite material is an insulating structure;
   wherein the composite material is a recyclable structure;
   wherein the composite material comprises an aluminum layer, a cardboard layer, and a second aluminum layer;
   wherein the aluminum layer attaches to the cardboard layer;
   wherein the second aluminum layer attaches to the cardboard layer;
   wherein the aluminum layer is a sheeting material formed from aluminum foil;
   wherein the aluminum layer forms an exterior surface of the composite material;
   wherein the aluminum layer forms the interior surface of the cup;
   wherein the second aluminum layer is a sheeting material formed from aluminum foil;
   wherein the second aluminum layer forms an exterior surface of the composite material;
   wherein the second aluminum layer forms the interior surface of the cup.

2. The semi-rigid container according to claim 1 wherein the composite material is a sheeting material.

3. The semi-rigid container according to claim 2 wherein the composite material is formed from recyclable materials.

4. The semi-rigid container according to claim 3 wherein the cup is formed by folding the previously determined number of pieces of the composite material into the cup shape.

5. The semi-rigid container according to claim 4 previously determined number the number of pieces of composite material used to fold the composite material into the cup shape is selected from the group consisting of one piece and two pieces.

6. The semi-rigid container according to claim 5
   wherein the cardboard layer is a sheeting material;
   wherein the cardboard layer is formed from cardboard;
   wherein the cardboard layer is enclosed by the aluminum layer and the second aluminum layer.

7. The semi-rigid container according to claim 6 wherein the cardboard layer is a semi-rigid structure.

8. The semi-rigid container according to claim 7 wherein the aluminum layer attaches as a layer to the cardboard layer.

9. The semi-rigid container according to claim 8 wherein the aluminum layer forms a fluid impermeable barrier that prevents the hot liquid from saturating the cardboard layer.

10. The semi-rigid container according to claim 9
wherein the truncated pyramidal shape comprises a lateral face, an open base, and a truncated apex;
wherein the lateral face forms the vertical containment of the containment structure formed by the truncated pyramidal shape of the cup;
wherein the open base is the base of the truncated pyramidal shape of the cup;
wherein the truncated apex is the surface of the truncated pyramidal shape of the cup that was truncated by the truncating plane;
wherein the open base forms the superior surface of the truncated pyramidal shape of the cup;
wherein the truncated apex forms the inferior surface of the truncated pyramidal shape of the cup.

11. The semi-rigid container according to claim 9
wherein the lateral face is a solid structure formed from the composite material;
wherein the open base is an open structure;
wherein the truncated apex further comprises an enclosing surface;
wherein the truncated apex is enclosed by the enclosing surface;
wherein the truncated apex is geometrically similar to the shape formed by the open base;
wherein the enclosing surface is a solid structure formed from the composite material.

12. The semi-rigid container according to claim 5
wherein the beeswax layer is a coating;
wherein the beeswax layer forms an exterior surface of the composite material;
wherein the beeswax layer forms the exterior surface of the cup.

13. The semi-rigid container according to claim 12 wherein the beeswax layer coats the surface of the cardboard layer that is distal from the aluminum layer.

14. The semi-rigid container according to claim 13 wherein the beeswax layer forms a fluid impermeable barrier.

* * * * *